United States Patent [19]

Liman et al.

[11] Patent Number: 5,350,781

[45] Date of Patent: Sep. 27, 1994

[54] PROCESS FOR THE PRODUCTION OF POLYURETHANE FOAMS

[75] Inventors: Ulrich Liman, Monheim; Hartwig Grammes, Leverkusen; Dirk Wegener, Monheim; Manuel Kaiser, Cologne, all of Fed. Rep. of Germany

[73] Assignee: Bayer Aktiengesellschaft, Leverkusen, Fed. Rep. of Germany

[21] Appl. No.: 123,951

[22] Filed: Sep. 20, 1993

[30] Foreign Application Priority Data

Sep. 28, 1992 [DE] Fed. Rep. of Germany ....... 4232420

[51] Int. Cl.$^5$ ............................................. C08G 18/00
[52] U.S. Cl. .................................. 521/174; 521/125
[58] Field of Search ................................ 521/174, 125

[56] References Cited

U.S. PATENT DOCUMENTS 4,868,043  9/1989  Eling et al. ..................... 428/304.4

FOREIGN PATENT DOCUMENTS 4218840  12/1993  Fed. Rep. of Germany .

*Primary Examiner*—John Kight, III
*Assistant Examiner*—Richard Lee Jones
*Attorney, Agent, or Firm*—Joseph C. Gil; N. Denise Brown

[57] ABSTRACT

A process for the production of polyurethane foams by reacting a reaction mixture consisting essentially of
  a) a polyisocyanate component, with
  b) a polyol component free from salt groups, in the presence of
  c) at least one blowing agent,
  d) salts of ester-functional $\alpha,\beta$-unsaturated carboxylic acids and, optionally,
  e) other auxiliaries and additives typically used in polyurethane chemistry.

Component d) the salts of ester-functional $\alpha,\beta$-unsaturated carboxylic acids are the reaction products of (i) monohydric or polyhydric alcohols, with (ii) unsaturated dicarboxylic acids or unsaturated dicarboxylic anhydrides, which contain on a statistical average at least one alkali metal carboxylate group and at most 0.5 alcoholic hydroxyl groups per molecule. The present invention also relates to the composites produced by back-foaming of a plastic film as a surface layer wherein the foam is produced by the process described above.

7 Claims, No Drawings

PROCESS FOR THE PRODUCTION OF POLYURETHANE FOAMS

BACKGROUND OF THE INVENTION

The present invention relates to a new process for the production of water-blown polyurethane foams, from starting materials known per se, using special $\alpha,\beta$-unsaturated ester carboxylic acids in the form of alkali metal salts as catalysts. More particularly, the invention relates to the production of composites by back-foaming of plastic films with reaction materials containing such catalysts which react to form polyurethane foam, and to the composites obtained therefrom.

Water-blown foams, more particularly composite films, produced by back-foaming of a plastics film with a reaction mixture that reacts out to form a flexible or semirigid polyurethane foam are of considerable industrial significance. These are widely used, for example, for the interior trim of motor vehicles and aircraft, and for the production of upholstery. For most of these applications, it is crucial that the foam have very little influence, if any, on the thermal ageing of the surface layer, in addition to having good mechanical properties.

More particularly, the thermal ageing behavior of known back-filled foams (i.e. the tendency of the PVC surface layer to turn brittle and crack) is a problem worth solving.

Constituents of the reaction mixture which react to form the polyurethane foam which promote poor thermal stability are, for example, the tertiary amines often used as catalysts. Previous attempts have been made to replace these amines, for example, by alkali metal salts of carboxylic acids, such as potassium acetate for example. However, catalysis with these catalysts alone is attended by the disadvantage of an excessively long demolding time or, where the catalyst is used in high concentrations, an excessively short cream time. Although the use of organotin compounds generally leads to an improvement in ageing behavior, it also leads to problems concerning the constant activation of the polyol component over a prolonged storage period on account of the hydrolysis stability of the organotin compounds in the water-containing polyol. In addition, so-called amine trapping agents are added to the foam system to improve its thermal stability. Unfortunately, these lead to only a gradual improvement and are unsuitable for amine-catalyzed systems.

U.S. Pat. No. 4,868,043 recommends the use of ester carboxylic acids as catalysts. These ester carboxylic acids are present in the alkali metal salt form of (i) intramolecular carboxylic anhydrides and (ii) monohydric alcohols free from ether groups. In particular, the use of semiesters present in the alkali metal salt form of (i) intramolecular carboxylic anhydrides and (ii) long-chain diols is preferred. However, the last of the above-mentioned catalysts, which are preferably used according to the document in question, have the disadvantage that, due to their monofunctionality in the context of the isocyanate addition reaction, they result in chain termination reactions and, accordingly, frequently result in poor processability of the reaction mixture and in foams of reduced tear strength. The ester carboxylic acid salts free from hydroxyl and ether groups which are not among the preferred catalysts according to the document cited above, show unsatisfactory compatibility with the other reactants. In addition, both types of catalyst described in U.S. Pat. No. 4,868,043 lead to reaction mixtures which do not optimally satisfy practical requirements with regards to the patio of cream time, which is preferably long, to demold time, which is preferably short.

It has now surprisingly been found that the problems mentioned hereinabove can be solved using the catalysts of the present invention which are described in detail hereinafter. The key point of the process according to the invention is that the catalysts used are selected $\alpha,\beta$-unsaturated ester carboxylates which do not exhibit the disadvantages mentioned hereinabove. This is due to their content of ether groups and/or their comparatively high content of carboxylate groups, coupled with the absence of chain terminating hydroxyl groups. However, these catalysts are capable, due to the presence of olefinic double bonds adjacent to the carboxylate groups, of the addition of amino groups which can form during the gradual ageing of the foam. Accordingly, the ageing of the foam and, optionally, the surface film is distinctly reduced. Although this mechanism of so-called amine trapping agents has hitherto been achieved with additives, the additives in question could not be used as catalysts for the PUR reaction (see also G. Avar, J. Thompson-Colon, SAE Conference 1988, 880 507).

The earlier German Patent Application, DE 4,218,840.7 is concerned with the use of similar catalysts in the production of polyurethane-based composite films. However, the ester carboxylates mentioned therein contain on a statistical average at least two hydroxyl groups per molecule. The present invention is not concerned with the use of such compounds.

DESCRIPTION OF THE INVENTION

The present invention relates to a process for the production of polyurethane foams comprising reacting a reaction mixture of
 a) a polyisocyanate component, with
 b) a polyol component free from salt groups, in the presence of
 c) at least one blowing agent, and
 d) salts of ester-functional $\alpha,\beta$-unsaturated carboxylic acids;
wherein d) the salts of ester-functional $\alpha,\beta$-unsaturated carboxylic acids comprise the salts of the reaction product of
 (i) alcohols selected from the group consisting of monohydric ether-functional alcohols having a molecular weight in the range of from 76 to 4000, polyhydric, optionally ether-functional alcohols having a molecular weight in the range of from 62 to 8000, and mixtures thereof; and
 (ii) $\alpha,\beta$-unsaturated dicarboxylic acids or intramolecular anhydrides thereof;
wherein said salts contain, on a statistical average, at least one alkali metal carboxylate group and at most 0.5 alcoholic hydroxyl groups per molecule, and are used in a quantity of from 0.01 to 100% by weight, based on the weight of component b). It is preferred that the salts of the ester-functional $\alpha,\beta$-unsaturated carboxylic acids are in the form of an alkali metal salt.

In addition, the reaction mixture optionally contains
 e) other auxiliaries and/or additives.

More particularly, the present invention also relates to the production of composites by back-foaming of a plastics film as a surface layer with a reaction mixture as described hereinabove, which reacts out to form a polyurethane foam.

Finally, the present invention also relates to the composites obtained by back-foaming.

The polyisocyanate component a) to be used in the process according to the invention may be any diisocyanate or polyisocyanate. It is preferred that isocyanates containing aromatically bound isocyanate groups are used. Suitable isocyanates include, for example, 2,4-diisocyanato toluene, and technical mixtures thereof with 2,6-diisocyanato toluene (TDI). In particular, it is preferred to use polyisocyanate mixtures of the diphenyl methane series (MDI) which are liquid at room temperature. Of particular interest in this regard are polyisocyanate mixtures of the type obtained by phosgenation of aniline/formaldehyde condensates, and distillation fractions or distillation residues obtained from such phosgenation products, or the corresponding urethane-, carbodiimide-, and/or uretdione-modified polyisocyanates or polyisocyanate mixtures of the diphenyl methane series. The preferred, optionally chemically modified, polyisocyanate mixtures of the diphenyl methane series generally have an NCO content of approximately 25 to 33% by weight.

Suitable as the polyol component b) are preferably the polyether polyols, or a mixture of polyether polyols having an average molecular weight, calculable from the hydroxyl group content and hydroxyl functionality, in the range of from 400 to 12,000, and preferably in the range of from 2000 to 6000, and an average hydroxyl functionality of from 2 to 8, and preferably of from 2 to 4. It is also possible to use a mixture of such polyether polyol s with polyhydric preferably di- or trihydric alcohols having a molecular weight below 400 in a quantity of up to 25% by weight, based on the weight of the polyether polyols.

The polyether polyols in question are known per se and may be obtained in known manner by alkoxylation of suitable starter molecules. Suitable starter molecules include, for example, ethylene glycol, propylene glycol, trimethylol propane, glycerol, sorbitol, pentaerythritol, and sucrose, and mixtures of such polyhydric alcohols. Polyether polyols prepared by the alkoxylation of trifunctional starter molecules, more particularly trimethylol propane and/or glycerol, are most particularly preferred. The alkylene oxides which are preferably used in the alkoxylation reaction are propylene oxide or ethylene oxide, or mixtures of these two alkylene oxides. The above mentioned alkylene oxides may also be successively used in the alkoxylation reaction. Additional suitable polyols which may be used as component b) are described, for example, in European Patent Application A-0,380,993.

Low molecular weight polyhydric alcohols having a molecular weight below 400, such as, for example, ethylene glycol, propylene glycol, diethylene glycol, dipropylene glycol, glycerol, trimethylol propane, or mixtures thereof, may also be part of component b) . These low molecular weight polyhydric alcohols may be used in quantities of up to 25% by weight, based on the weight of the polyether polyols.

Component c), the blowing agent is preferably water. In addition to water, halogenated hydrocarbons, including, for example, trifluorochloromethane, and fluorinated hydrocarbons; readily volatile organic solvents, including, for example, pentane, acetone, and diethyl ether; may also be used as blowing agents. However, the use of such blowing agents along with water is less preferred.

The catalysts d) which are critical to the present invention are $\alpha,\beta$-unsaturated ester carboxylates which, on a statistical average, contain from 0 to 0.5 hydroxyl groups per molecule, and at least one, and preferably 2 to 4, carboxylate groups. The ester carboxylates in question are the reaction products present in the salt form of (i) certain alcohols with (ii) $\alpha,\beta$-olefinically unsaturated dicarboxylic acids or anhydrides of such acids.

Suitable alcohols (i) include, for example:

(ia) monohydric polyether alcohols having a molecular weight in the range of from 76 to 4000, and preferably in the range of from 250 to 1000, which may be obtained in known manner by the alkoxylation of monohydric alcohols free from ether groups. Suitable polyether alcohols include, for example, the ethoxylation and/or propoxylation products of $C_{1-8}$ alkanols such as, for example, methanol, ethanol, the isomeric propanols, butanols, hexanols, or octanols;

(ib) polyhydric alcohols free from ether groups having a molecular weight in the range of from 62 to 300, including, for example, ethylene glycol, propylene glycol, glycerol, trimethylol propane, sorbitol, and pentaerythritol;

(ic) the ethoxylation and/or propoxylation products having a maximum molecular weight of 8000, and preferably in the range of from 300 to 1000, of polyhydric alcohols free from ether groups of the type mentioned by way of example hereinabove; and (id) mixtures of the above-mentioned alcohols.

$\alpha\beta$-Unsaturated dicarboxylic acids or anhydrides of such acids are suitable as component (ii) for the production of the catalysts d). These include, for example, fumaric acid, maleic acid, and maleic anhydride. It is particularly preferred to use maleic anhydride.

The ester-functional carboxylic acids used as component d) are produced from starting materials (i) and (ii) described hereinabove, by methods known per se, generally in bulk, at temperatures in the range of from 20° to 100° C. until the theoretical acid value of the reaction product has been reached. The carboxyl groups formed are converted into carboxylate groups, preferably using hydroxides, carbonates, or dicarbonates of sodium or potassium or amine catalysts which are typically used in polyurethane chemistry of the type mentioned by way of example hereinafter, with the bases preferably being used in the form of aqueous solutions. Accordingly, mixtures of catalyst d) and blowing agent c) according to the invention are directly obtained, and are then mixed with component b), and optionally with component e). The preparation of the salts serving as catalysts (i.e. component d)) by the neutralization of the corresponding ester carboxylic acids may also be carried out in component b), or in part of the alcohols used as component b), so that solutions of the catalysts d) in the polyol component b) or in a part thereof, are directly obtained.

If larger quantities of water are required for the preparation of the salts than will be subsequently needed as blowing agents, the unwanted excess of water may, of course, be removed by distillation before the process according to the invention is carried out.

The catalysts d) which are crucial to the present invention are used in a quantity of from 0.01 to 100% by weight, and preferably in a quantity of 0.I to 10% by weight, based on the weight of component b), to carry out the process according to the invention.

In addition to the catalysts d) which are critical to the invention, the reaction mixture may also contain other catalysts known per se. However, it is less preferred that additional catalysts be used. Catalysts such as these are, for example, alkali metal salts of carboxylic acids which do not correspond to the definition of component d). This includes, for example, potassium acetate, potassium tartrate, or potassium succinate; or conventional catalysts, such as triethylene diamine, bis-(2-dimethylaminoethyl)-ether, N,N-dimethyl ethanolamine, N,N,N',N'',N''-pentamethyl diethylene triamine, N-methyl morpholine, dimethyl benzyl amine, tertiary alkyl phosphines, tin (II) octoate, dibutyl tin (IV) dilaurate, and chelates of metals, such as, for example, chelates of the acetyl acetonate of magnesium, zirconium, or nickel. These optional catalysts, are considered to be part of optional component e) additional additives. If these other additives are used, it is in quantities of at most 1.0% by weight, based on the weight of component b).

Other additives e), include the usual additives, such as, for example, flameproofing agents, fillers, pigments, plasticizers, antistatic agents, and/or cell regulating agents.

In the practical application of the process according to the invention, the starting materials mentioned hereinabove are reacted with one another in quantities such that the NCO index is from 60 to 140, wherein the NCO index is defined as the number of NCO groups divided by the number of NCO-reactive groups, multiplied by 100. In general, components b) to e) are mixed to form a "polyol component" which is then reacted with the polyisocyanate component, i.e. component a), by the methods typically used in the production of polyurethane foams.

The process according to the invention is suitable for the production of foams. However, the products obtained by the process according to the invention are flexible or semirigid polyurethane foams (compression hardness ranges of from 20 to 400 KPa for 40% compression) having a density of from 30 to 500 kg/m³, and preferably of from 30 to 200 kg/m³, which may be used in known manner for the back-foaming of plastics films to produce composite films for upholstery purposes, and for the interior of motor vehicles, aircraft or ships (i.e. instrument panels, interior door trim, armrests, head restraints, etc.).

Plastics films suitable for this particular purpose are any of the surface layers which have hitherto been produced in the production of composite films by back-foaming of plastic films with polyurethane foams. Films of polyvinyl chloride (PVC) polyurethane, polymer blends of PVC and ABS, or thermoplastic polyolefins are mentioned by way of example.

The process according to the invention is preferably carried out by lining the inner walls of a mold at least partly with the plastics film to be back-foamed, and then filling the mold with the foamable mixture. The films used for internally lining the mold may be preformed in known manner by the known technique of thermoforming or the powder slush method.

The quantity of foamable mixture introduced into the mold is generally gauged in such a way that foams having densities in the above-mentioned range are obtained.

The process according to the invention is further illustrated but is not intended to be limited by the following examples in which all parts and percentages are by weight unless otherwise specified.

EXAMPLES

1. Production of a catalyst suitable for use in accordance with the invention 265 g (2.7 mol) maleic anhydride are stirred with 675 g (1.0 mol) of a polyether polyol having a molecular weight of 675, prepared by propoxylation of trimethylol propane, at 50° C. until the anhydride has dissolved. The reaction is terminated when an acid value of 161 mg KOH/g is reached. The semiester produced in this way is converted into the corresponding alkali metal salt in the next reaction stage.

2. Preparation of a polyol formulation according to the invention

100 Parts by weight of a polyether polyol, OH value 28, prepared by propoxylation of trimethylol propane and subsequent ethoxylation of the propoxylation product (PO:EO ratio by weight 85:15) are mixed with 3 parts by weight of the semiester described in 1. The resulting mixture is then mixed with 0.48 part by weight potassium hydroxide dissolved in 2.3 parts by weight water.

3. Polyisocyanate component

A polyisocyanate mixture of the diphenyl methane series containing about 50 % by weight of 4,4'-MDI, about 5 % by weight of 2,4'-MDI and 45% by weight of tri-and polyfunctional MDI having a viscosity (23° C.) of 200 mPa.s and an NCO content of 32% by weight was used in the following Examples.

4. Example according to the invention and Comparison Examples

The foams were produced by the hand foaming method. All the components except for the polyisocyanate are initially stirred for 30 s (stirring speed 1000 r.p.m.). The polyisocyanate component is then added and stirring is continued for another 10 s at room temperature. In all the examples, the NCO index is 100.

The liquid foamable mixture is then poured into a sheet mold measuring 20×20×2 cm of which the inner walls have been lined with a 1 mm thick film of flexible PVC. The quantity of foamable mixture is gauged in such a way that the resulting foam has a density of 150 kg/m³.

The cream, rise and gel times were determined in parallel tests, the polyol formulation being combined with the polyisocyanate component while stirring at room temperature in a glass beaker, as described hereinabove. The cream time is the time elapsing from the moment the polyisocyanate is added to the beginning of the foaming reaction. The rise time is the time elapsing from the moment the polyisocyanate is added to the end of the foaming reaction. The gel time is the time elapsing from the addition of the polyisocyanate until the foam is tack-free.

Breaking elongation was tested on the surface film of the sheet produced in accordance with DIN 53571. Fogging behavior was tested on foam test disks measuring 8 cm in diameter and 2 cm thick. The test specimens were then heated for 16 hours to 100° C. under a cooled glass disk and the condensate formed on the cooled glass disk was weighed (according to DIN 75201 method B).

The compression hardness at 40% compression according to DIN 53577 was measured on the foam sheet before and after ageing (500 h, 120° C). The difference in compression hardness after ageing of the foam was expressed as percentage property retention, based on the unaged foam. Details can be found in the following Table.

Example A corresponds to the invention using the starting materials mentioned hereinabove.

Examples B, C, and D are Comparison Examples.

Example B corresponds to Example A except that the catalyst used in Example A (i.e. the semiester prepared in step 1) and the potassium hydroxide used for its neutralization in step 2)) is replaced by 0.3 parts by weight of potassium acetate.

Example C is also a Comparison Example. It corresponds to Example A except that the catalyst used in Example A is replaced by 0.76 parts by weight of permethylated diethylene diamine.

Example D is also a Comparison Example. It corresponds to Example A except that the catalyst used in Example A is replaced by 4 parts by weight of the reaction product of equimolar quantities of polyethylene glycol having a molecular weight of 600, with maleic anhydride, followed by neutralization with a stoichiometric quantity of potassium hydroxide.

In all of the examples, the catalyst concentrations were selected so that substantially the same rise times were obtained.

TABLE I

| Example | A | B | C | D | Unaged film |
|---|---|---|---|---|---|
| Cream time (s) | 34 | 12 | 14 | 22 | — |
| Rise time (s) | 103 | 100 | 100 | 105 | — |
| Gel time (s) | 100 | 130 | 100 | 120 | — |
| Elongation at break of the surface film after ageing for 500 h at 120° C. (N/mm) | 180 | 39 | 9 | 39 | 250 |
| Fogging behavior (mg) | 0.4 | 0.6 | 1.7 | 0.4 | — |
| Property retention after ageing for 500 h at 120° C. in (%), based on compression hardness | 86 | 60 | 45 | 60 | — |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the production of polyurethane foams comprising reacting a reaction mixture consisting essentially of
   a) a polyisocyanate component, with
   b) a polyol component free from salt groups, in the presence of
   c) at least one blowing agent, and
   d) salts of ester-functional $\alpha,\beta$-unsaturated carboxylic acids, the improvement comprising d) said salts of ester-functional $\alpha,\beta$-unsaturated carboxylic acids comprising the salt of the reaction products of
   (i) alcohols selected from the group consisting of monohydric ether-functional alcohols having a molecular weight in the range from 250 to 1000, and polyhydric, optionally ether-functional alcohols having a molecular weight in the range from 62 to 8000, and mixtures thereof; and
   (ii) $\alpha,\beta$-unsaturated dicarboxylic acids, or intramolecular anhydrides thereof; wherein said salts contain on a statistical average, at least one alkali metal carboxylate group and at most 0.5 alcoholic hydroxyl groups per molecule, and are present in a quantity of from 0.01 to 100% by weight, based on the weight of component b).

2. The process of claim 1 wherein said reaction mixture additionally comprises e) other additives.

3. The process of claim 1, wherein a) said polyisocyanate component is a liquid, optionally urethane-, carbodiimide-and/or uretdione-modified polyisocyanate mixture of the diphenyl methane series which is liquid at room temperature.

4. The process of claim 1, wherein b) said polyol component free from salt groups is selected from the group consisting of polyether polyols having an average hydroxyl functionality of 2 to 4 and a molecular weight of 400 to 12,000, mixtures of polyether polyols having an average hydroxyl functionality of 2 to 4 for a molecular weight of 400 to 12,000, and mixtures of polyether polyols having an average hydroxyl functionality of 2 to 4 and a molecular weight of 400 to 12,000 with up to 25% by weight, based on the total weight of component b), of dihydric and/or trihydric alcohols having a molecular weight below 400.

5. The process of claim 1, wherein c) said blowing agent is water.

6. In a process for the production of composite materials by back-foaming a plastic film as a surface layer with a polyurethane foam, the improvement comprising said polyurethane foam being produced by the process of claim 1.

7. The composite material produced by the process of claim 6.

* * * * *